(12) United States Patent
Takahashi

(10) Patent No.: US 8,599,391 B2
(45) Date of Patent: Dec. 3, 2013

(54) MULTIPLE MEDIA TYPE PRINTING

(75) Inventor: Daisuke Takahashi, Foster City, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 642 days.

(21) Appl. No.: 12/769,603

(22) Filed: Apr. 28, 2010

(65) Prior Publication Data

US 2011/0267640 A1    Nov. 3, 2011

(51) Int. Cl.
*G06F 3/12* (2006.01)
*G06K 15/00* (2006.01)
*G06K 15/02* (2006.01)
*G03G 15/00* (2006.01)
*G03G 15/041* (2006.01)
*B65H 3/44* (2006.01)
*B65H 5/26* (2006.01)

(52) U.S. Cl.
USPC ....... 358/1.13; 358/1.18; 358/1.15; 358/1.12; 358/1.2; 358/1.1; 399/86; 399/197; 271/9.06; 271/9.05; 271/9.03; 271/9.02

(58) Field of Classification Search
None
See application file for complete search history.

(56) References Cited

U.S. PATENT DOCUMENTS

| | | | | |
|---|---|---|---|---|
| 5,031,116 A | * | 7/1991 | Shukunami et al. | 358/1.2 |
| 5,289,236 A | * | 2/1994 | Yoshino | 399/86 |
| 5,393,043 A | * | 2/1995 | Nitta | 271/9.06 |
| 6,401,141 B1 | * | 6/2002 | Kumler | 710/10 |
| 6,775,488 B2 | * | 8/2004 | Sawada | 399/45 |
| 7,173,718 B2 | * | 2/2007 | Iwata et al. | 358/1.13 |
| 7,352,487 B2 | * | 4/2008 | Tokashiki | 358/1.18 |
| 7,916,325 B2 | * | 3/2011 | Ebuchi | 358/1.15 |
| 2002/0085186 A1 | * | 7/2002 | Sawada | 355/40 |
| 2002/0181022 A1 | * | 12/2002 | Tokashiki | 358/1.18 |
| 2003/0007179 A1 | * | 1/2003 | Ferlitsch | 358/1.16 |
| 2003/0174346 A1 | * | 9/2003 | Nagatani | 358/1.2 |
| 2004/0109176 A1 | * | 6/2004 | Osari | 358/1.2 |
| 2007/0229877 A1 | * | 10/2007 | Shima | 358/1.14 |
| 2008/0158624 A1 | * | 7/2008 | Hayashi | 358/498 |
| 2011/0075197 A1 | * | 3/2011 | Hoarau et al. | 358/1.15 |

* cited by examiner

*Primary Examiner* — King Poon
*Assistant Examiner* — Vincent Peren
(74) *Attorney, Agent, or Firm* — Osha Liang LLP

(57) ABSTRACT

A method for printing including receiving, by a printer, a first page image, a second page image, and a selection for enabling media type substitution. The printer identifies a preferred media type and an alternate media type, where the preferred media type and the alternate media type include a common printable area (CPA), and the first page image and the second page image are modified to match a dimension of the CPA. The printer then selects the preferred media type for printing the first page image. The printer receives a message, after receiving the selection enabling media type substitution, associated with the preferred media type after selecting the first media type. The printer then selects the alternate media type in response to the message and the selection enabling media type substitution, and prints the second page image using the alternate media type.

10 Claims, 10 Drawing Sheets

FIG. 2A

Preferred Media Type: A4 ▼

[X] Media Type Substitution
[X] Image Centering

[Print]

FIG. 2B

Preferred Media Type: B5 ▼

[ ] Media Type Substitution
[ ] Image Centering

[Print]

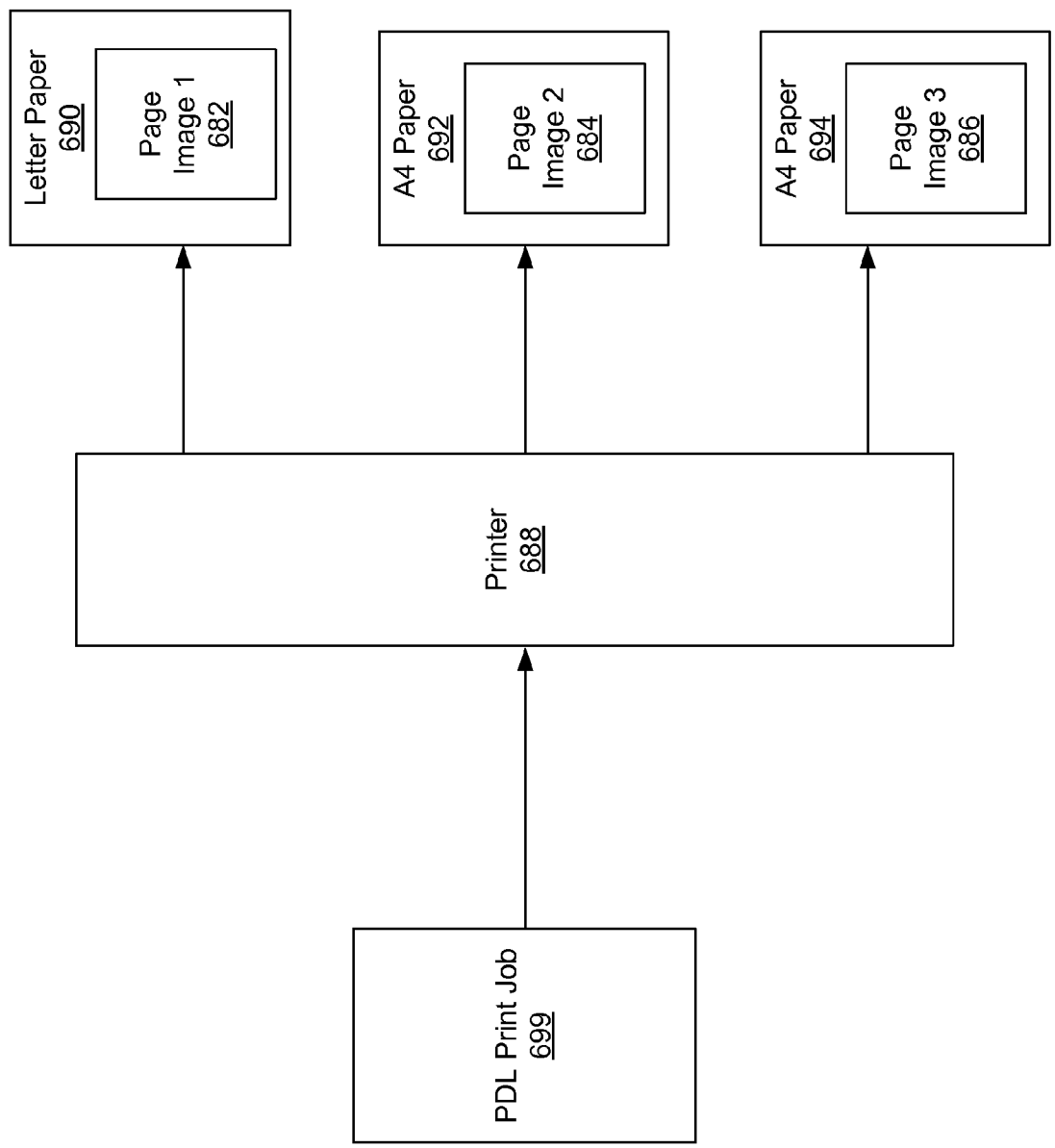

MULTIPLE MEDIA TYPE PRINTING

BACKGROUND

Although the demand for printed copies of electronic documents is decreasing because of recent improvements in computer displays, there are still those who generate hard copies of documents for purposes of reading the documents. For example, some readers may simply prefer reading a hard copy over staring at a computer screen. In other instances, copies of documents may be provided to a group of people at an informal presentation, or in other situations where reading from a projector screen or computer display is not convenient.

In addition, readers may prefer to instantly skip unnecessary pages by flipping pages of printed media (documents), or annotating by hand instead of scanning and inserting annotations using keyboard or mouse input devices. For the above reasons, printed media continues to be a dependable resource to read any type of document.

When reading is completed, readers typically recycle or discard the papers, with no intention of keeping the printed media, often because the contents are not very important. Accordingly, the readers do not typically have any preference for the size of output media on which documents are printed.

SUMMARY

In general, in one aspect, the invention relates to a method for printing. The method comprises: obtaining, by a printer, a print job including a first page image, a second page image, and a selection for enabling media type substitution; obtaining, by the printer, a preferred media type and an alternate media type, wherein the preferred media type and the alternate media type comprise a common printable area (CPA), and wherein the first page image and the second page image are modified to match a dimension of the CPA before printing; selecting, by the printer, the preferred media type for printing the first page image; receiving, by the printer, a message associated with the preferred media type after selecting the first media type, wherein the printer receives the selection enabling media type substitution prior to receiving the message; selecting, by the printer, the alternate media type in response to the message and the selection enabling media type substitution; and printing the second page image using the alternate media type.

In general, in one aspect, the invention relates to a method for printing. The method comprises: receiving a request to print a plurality of page images; displaying, within a graphical user interface (GUI), a plurality of printing options including an option to enable media type substitution; collecting, using the GUI, a selection enabling media type substitution, a preferred media type, and an alternate media type; identifying a common printable area (CPA) of the preferred media type and the alternate media type; modifying the plurality of page images to match a dimension of the CPA; sending the plurality of page images, an indication of the preferred media type, an indication of the alternate media type, and an indication that media type substitution is enabled to a printer, wherein the printer selects, after selecting the preferred media type for printing, the alternate media type for printing in response to the indication that media type substitution is enabled and a received message associated with the preferred media type, wherein the printer receives the indication that media type substitution is enabled prior to receiving the message.

In general, in one aspect, the invention relates to a computer readable storage medium comprising instructions for printing. The instructions comprise functionality to: receive a request to print a plurality of page images; display, within a graphical user interface (GUI), a plurality of printing options including an option to enable media type substitution; collect, using the GUI, a selection for enabling media type substitution, a preferred media type, and an alternate media type; identify a common printable area (CPA) of the preferred media type and the alternate media type; modify the plurality of page images to match a dimension of the CPA; send the plurality of page images, an indication of the preferred media type, an indication of the alternate media type, and an indication that media type substitution is enabled to a printer, wherein the printer selects, after selecting the first media type for printing, the alternate media type for printing in response to the indication that media type substitution is enabled and a received message associated with the preferred media type, wherein the printer receives the indication that media type substitution is enabled prior to receiving the message.

In general, in one aspect, the invention relates to a method for printing. The method comprises: receiving a request to print a plurality of pages; displaying, within a graphical user interface (GUI), a plurality of printing options including an option to enable media type substitution; collecting, using the GUI, a selection enabling media type substitution, a preferred media type, and an alternate media type; generating a plurality of page descriptor language (PDL) commands based on the selection enabling media type substitution, the preferred media type, and the alternate media type, and comprising a plurality of objects based on the pages; and sending the plurality of PDL commands to a printer, wherein the printer generates a plurality of page images by rasterizing the plurality of objects; and wherein the printer comprises functionality to select, after selecting the preferred media type for printing a first page image, the alternate media type based on a received message and the selection enabling media type substitution, and wherein the printer prints the second page image using the alternate media type.

In general, in one aspect, the invention relates to a system for printing a plurality of page images. The system comprises: a processor; a graphical user interface (GUI) executing on the processor and configured with functionality to collect a preferred media type, an alternate media type, and a selection for enabling media type substitution; a printer driver executing on the processor and configured to with functionality obtain a common printable area (CPA) of the preferred media type and the alternate media type, and modify the plurality of page images to match a dimension of the CPA; and a printer configured with functionality to select, after selecting the preferred media type for printing a first page image, the alternate media type based on a received message and the selection enabling media type substitution, and print the second page image using the alternate media type.

In general, in one aspect, the invention relates to a graphical user interface (GUI) associated with a printer driver for printing a plurality of page images. The GUI comprises: a media type selection menu comprising a plurality of media types for selection by a user, wherein the GUI is configured to collect a preferred media type and an alternate media type from the user using the media type selection menu; and an option for enabling media type substitution, wherein the GUI executes on a processor of a computing device and is used to send printing instructions to a printer, wherein the printer is configured to select, after selecting the preferred media type for printing a first page image, the alternate media type based on a received message and the selection for enabling media type substitution, and print the second page image using the alternate media type.

In general, in one aspect, the invention relates to a method for generating a print job. The method comprises: accepting a user input of print condition for printing at least one page of a document; and generating, in accordance with the user input, a print job for the at least one page of the document, the print job including a preferred media type and an alternate media type both of which are applicable to a same page of the at least one page.

Other aspects of the invention will be apparent from the following description and the appended claims.

BRIEF DESCRIPTION OF DRAWINGS

FIGS. 2A-2B show a user interface for printing a document in accordance with one or more embodiments of the invention.

FIGS. 6A and 6B show examples of printing documents on different media types in accordance with one or more embodiments of the invention.

DETAILED DESCRIPTION

Figure 1:
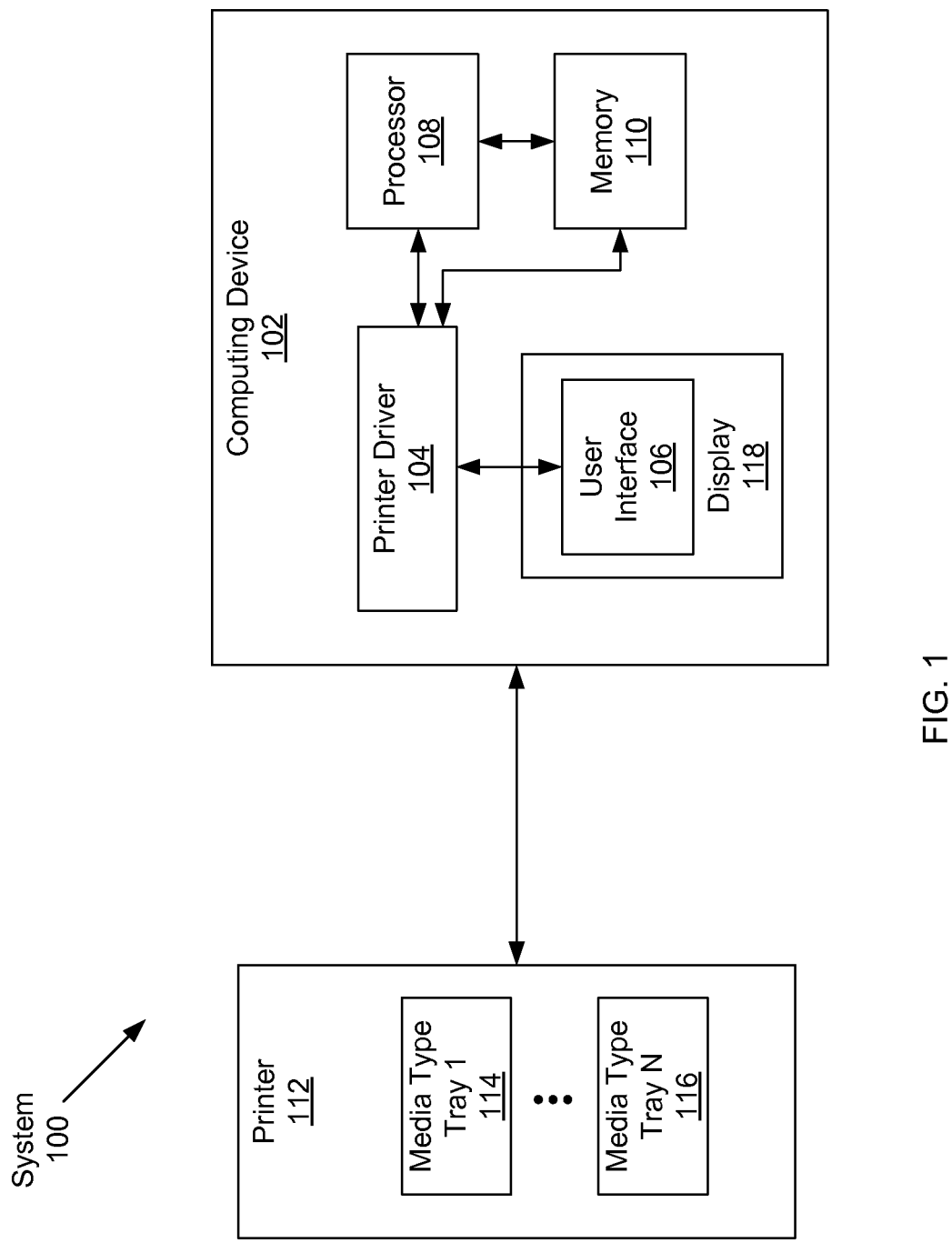
FIG. 1 shows a flow diagram of a system for printing a document in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In general, embodiments of the invention relate to a method and system for printing electronic documents. More specifically, embodiments of the invention relate to a method and system enabling a printer to print page images of a document on different media types (e.g., letter, A4, glossy/matte, etc.) without any temporary suspension of the print job. Embodiments of the invention also relate to providing a print user interface to enable printing on different media types.

FIG. 1 shows a printing system (100) in accordance with one or more embodiments of the invention. The system (100) includes a computing device (102) operatively connected to a printer (112). The computing device (102) includes a display (118), a printer driver (104), a processor (108), and memory (110). The printer (112) includes a plurality of printer trays storing different media types (e.g., media type tray 1 (114), media type tray N (116)). Each of the aforementioned components of the printing system (100) is described below.

The computing device (102) may be any computer system, including a personal computer, desktop computer, thin computer, or any other suitable computer system. The computing device (102) may also be a hand-held electronic device, such as a media device, a personal digital assistant, a smart phone, combinations thereof, or any other suitable computing device capable of executing printer driver (104) software.

The computing device (102) is configured to execute the printer driver (104) software. More specifically, the processor (108) of the computing device (102) executes the printer driver (104) software, and the memory (110) is used to store the printer driver (104) software in the computing device (102). In one or more embodiments of the invention, the computing device (102) is used by a user printing an electronic document (not shown). More specifically, the computing device (102) includes an output display (118) (e.g., monitor or screen) on which an electronic document is displayed for printing.

An electronic document may be any softcopy of a document that a user prints to obtain a hard copy. The electronic document may be a PDF document, an image, a word document, digital drawings, pages from a website, or any other suitable document that may be printed. Further, electronic documents to be printed on paper are conventionally created by application software executing on the computing device (102) or downloaded via a network connection (e.g., the Internet) and displayed on a web browser on the display (118) of the computing device (102).

Continuing with FIG. 1, the user interface (106) may be a graphical user interface (GUI) that displays the printing options selectable by the user printing an electronic document. Further, in one or more embodiments of the invention, the user interface (106) allows a user to select a preferred media type for printing the document. Papers having different sizes (e.g., A4, letter, legal, etc.), different weights, different finishes (e.g., glossy, matte, etc.) may be referred to as different media types. For example, media type tray 1 (114) may store A4 paper and media type tray N (116) may store letter paper. A preferred media type is the preferred type of paper that the user selects for printing the electronic document. In one or more embodiments of the invention, the memory (110) may also be used to store dimensions of printable areas corresponding to different media types.

In one or more embodiments of the invention, the printer driver (104) is configured to generate and display the user interface (106) on an output display (118) of the computing device (102). The user interface (106) may be launched by a user that is printing an electronic document. The printer driver (104) includes functionality to receive input via the user interface (106) and send instructions for printing the document to the printer (112) based on the options selected by a user via the user interface (106).

In one or more embodiments of the invention, the printer driver (104) is configured to display, via the user interface (106), an option selectable by the user for enabling media type substitution. The media type substitution option, when enabled, instructs the printer to substitute one or more alternate media types for a preferred media type when the preferred media type is unavailable. Further, the printer driver may be configured to calculate a common printable area (CPA) corresponding to the preferred media type and the one or more alternate media types for printing page images of a document.

In one or more embodiments of the invention, the printer driver (104) is software operatively connected to the printer (112) and configured to convert the data in the document and the printing options (e.g., printing options selected by the user from the GUI (106)) to a specific format required by the printer (112). For example, in the case of page descriptor language (PDL) printing schemes, the printer driver (104) generates a print job described in page descriptor language (PDL) based on the document content and the printing options. The PDL commands/instructions include various print objects (e.g., text objects, graphic objects, image objects) and control objects (e.g., blend and transparency commands, color management information) to describe the page for printing. The printer (e.g., printer (112)) interprets the PDL commands/instructions to generate page images (i.e., the printer rasterizes the objects). As another example, in the case of raster printing, the printer driver (104) generates page images (i.e., rasterized image data such as bitmap data) based on the document content and the printing options, and sends the page images to the printer.

Those skilled in the art will appreciate that while FIG. 1 shows the printer driver (104) software and the user interface as being resident on a single computing device (102), the printer driver (104) software and the user interface (106) may be on different physical computing devices. For example, the printer driver (104) software may be resident on the computing device (102) but the user interface (106) may be displayed on a remote system being used by the user printing a document.

The printer (112) is configured to receive instructions from the printer driver (104) and print the electronic document in accordance with the instructions received. In the case of raster printing, the incoming instructions include rasterized image data (e.g., bitmap data) for printing. In the case of PDL printing schemes, the incoming instructions are PDL commands associated with print objects and control objects (discussed above). The printer may interpret the incoming PDL commands in order to generate page images (i.e., the printer rasterizes the objects). Like the printer driver (104), the printer (112) may also be configured to calculate a common printable area (CPA) corresponding to the preferred media type and the one or more alternate media.

In one or more embodiments of the invention, the printer (112) is configured to receive and process messages associated with the media type trays (114, 116). Messages may include warning messages (e.g., paper low) or error messages (e.g., paper tray empty, paper jam, etc.). The printer (112) includes physical media type trays (114, 116) for storing one or more different media types.

FIGS. 2A and 2B show examples of a user interface generated by the printer driver in accordance with one or more embodiments of the invention. Both FIGS. 2A and 2B show a drop down menu bar for selecting a preferred media type, options for enabling media type substitution and image centering, and a print button/selection for sending instructions to print a document to a printer. Although not shown, the user interface may have an option for corner alignment (discussed below). A user, upon launching the user interface, may select a preferred media type, and enable media type substitution and image centering (or corner alignment) by selecting the boxes next to those options. In FIG. 2A, the preferred media type selected by a user printing a document is A4 paper. Further, in FIG. 2A, the user has enabled both media type substitution and image centering, as indicated by the selection of the boxes next to each option. In FIG. 2B, the preferred media type selected by a user is B5 paper, and the options for media type substitution and image centering are not enabled. Upon selecting the printing options detailed above via the user interface, the user confirms the selected options by selecting the print button shown on the bottom right corner in FIGS. 2A and 2B.

In one or more embodiments of the invention, image centering may only be made available for selection when media type substitution is enabled. Alternatively, the printer driver may be configured to center an image being printed regardless of whether media type substitution is enabled. Those skilled in the art will appreciate that, although not shown in FIGS. 2A and 2B, enabling media type substitution may result in the display of another menu or selection of options for specifying one or more alternate media types that may be substituted for the preferred media type. Alternatively, in one or more embodiments of the invention, media type substitution may be limited to a predetermined number of media types or pairs of media types. For example, media type substitution may be limited to an A4-letter paper substitution pair in which A4 and letter paper may be substituted for one another. In this case, if another type of media is selected as the preferred media type, such as the B5 media type selected in FIG. 2B, media type substitution may remain disabled in the user interface by the printer driver. Further, those skilled in the art will appreciate that the preferred media type may correspond to a default media type automatically be selected by the printer driver.

Those skilled in the art will appreciate that while FIGS. 2A-2B show drop down menu for the preferred media type and selectable check boxes for the media type substitution and image centering options, these options may be represented on the user interface using any common user interface component, such as clickable buttons, options that are highlighted by the user when selected, a text input field into which text may be typed to specify media type substitution or image centering, or any other suitable type of user interface component.

Figure 3C:
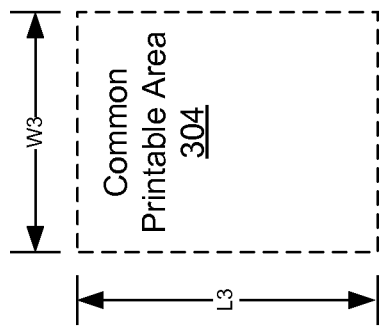
FIG. 3A-3C show a common printable area (CPA) for a preferred and an alternate media type in accordance with one or more embodiments of the invention.
Figure 3B:
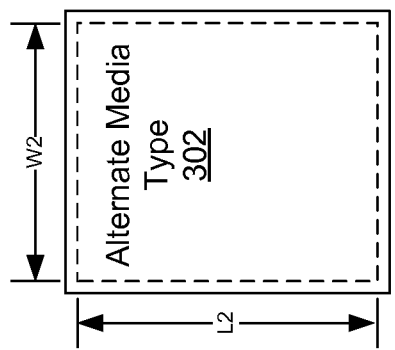
Figure 3A:
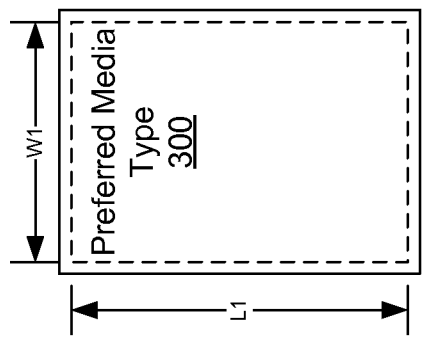

FIGS. 3A-3C show dimensions for a preferred media type, dimensions for an alternate media type, and the dimensions of a common printable area corresponding to the preferred media type and the alternate media type in accordance with one or more embodiments. Specifically, in FIG. 3A, the preferred media type (300) is shown to have a length of L1 and a width of W1 corresponding to the printable area of the preferred media type (300), represented by the dotted line (which excludes margins). Similarly, in FIG. 3B, the length L2 and width W2 of an alternate media type (302) that may be substituted for the preferred media type is shown.

In FIG. 3C, a common printable area (304) corresponding to the printable areas of both the preferred media type (300) and the alternate media type (302) is shown. More specifically, in one or more embodiments of the invention, the common printable area (304) represents the maximum printable area that is common to both the preferred media type and the alternate media type. In one or more embodiments, the common printable area (304) is the area onto which a page image from a document is printed such that the entire page image prints on both media types, without any of the page image being cut off or omitted when media type substitution is implemented by a printer.

Those skilled in the art will appreciate that when there are multiple alternate media types selectable by a user, a common printable area that corresponds to the preferred media type and each of the alternate media types is calculated. Further, those skilled in the art will appreciate that a common printable area that is smaller than the maximum printable area common to preferred and alternate media types may also be calculated.

For example, consider the scenario in which the preferred media type of FIG. 3A is A4 paper and the alternate media type of FIG. 3B is letter paper, where the letter paper may be a substitution for A4 paper when media type substitution is enabled by a user printing a document. In this example, the common printable area (304) of FIG. 3C that is calculated for both A4 and letter media types would have a length L3 that is equal to the length of the printable area of letter paper, and a width W3 that is equal to the width of the printable area of A4 paper. This length and width represents the maximum common printable area for both letter and A4 media types.

Figure 4A:
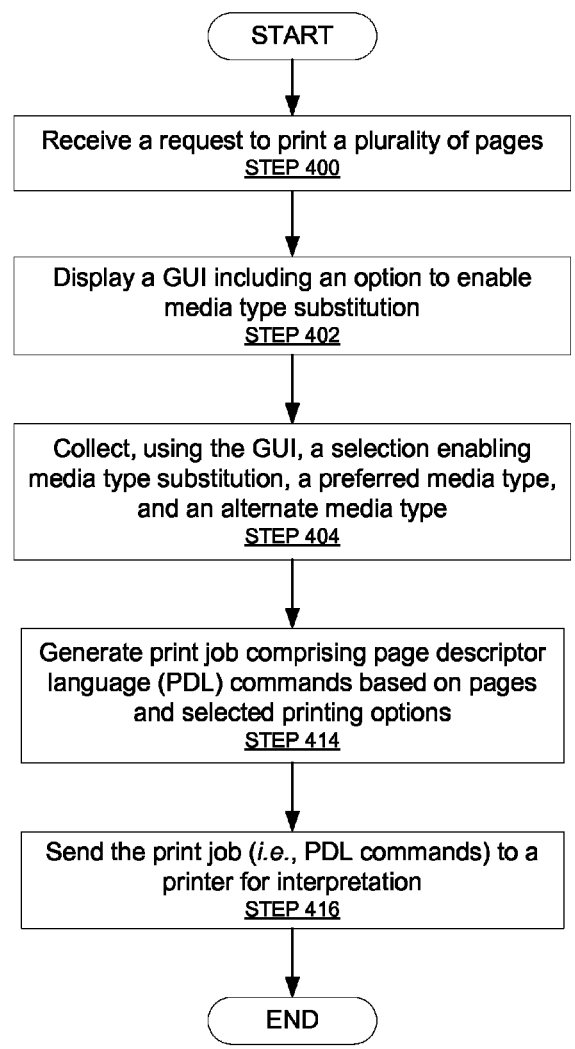
FIGS. 4A, 4B, 5A, and 5B show flowcharts for printing a document in accordance with one or more embodiments of the invention.

FIG. 4A shows a flow chart in accordance with one or more embodiments of the invention. The process shown in FIG. 4A may be used for PDL printing one or more pages of a document. Further, one or more steps in FIG. 4A may be executed by a printer driver (e.g., printer driver (104), discussed above in referenced to FIG. 1). In one or more embodiments of the invention, one or more of the steps shown in FIG. 4A may be omitted, repeated, and/or performed in a different order than that shown in FIG. 4A. Accordingly, the specific arrangement of steps shown in FIG. 4A should not be construed as limiting the scope of the invention.

Initially, a request to print multiple pages is received by the printer driver software (STEP 400). The pages may be part of an electronic document that a user is printing. Next, the printer driver software displays a graphical user interface (GUI) including an option to enable media type substitution to a user (STEP 402). The GUI may be displayed on any computing device from which a user sends a command to print a document. At this stage, the printer driver software collects, using the GUI, a selection enabling media type substitution, a preferred media type, and an alternate media type (STEP 404). More specifically, the user selects, via the GUI, the option for enabling media type substitution, selects a preferred media type (or uses the default preferred media type), and selects an alternate media type. The user may also select (and thus the printer driver software may collect) requests for image centering or corner alignment using the GUI. Each of these inputs is collected by the printer driver software.

In STEP 414, the printer driver software generates a print job comprising PDL commands based on the contents of the pages and the collected printing options from the GUI. The PDL commands/instructions include various print objects (e.g., text objects, graphic objects, image objects) and control objects (e.g., blend and transparency commands, color management information) to describe the contents and their layout of each page for printing. In one or more embodiments of the inventions, the PDL commands/instructions identify the preferred media type and the alternate media type. In one or more embodiments of the invention, PDL commands include an indication that media type substitution is enabled and/or instructions to center the plurality of pages within the printable area of the media type. In STEP 416, the print job comprising the PDL commands is sent to the printer for interpretation.

Figure 4B:
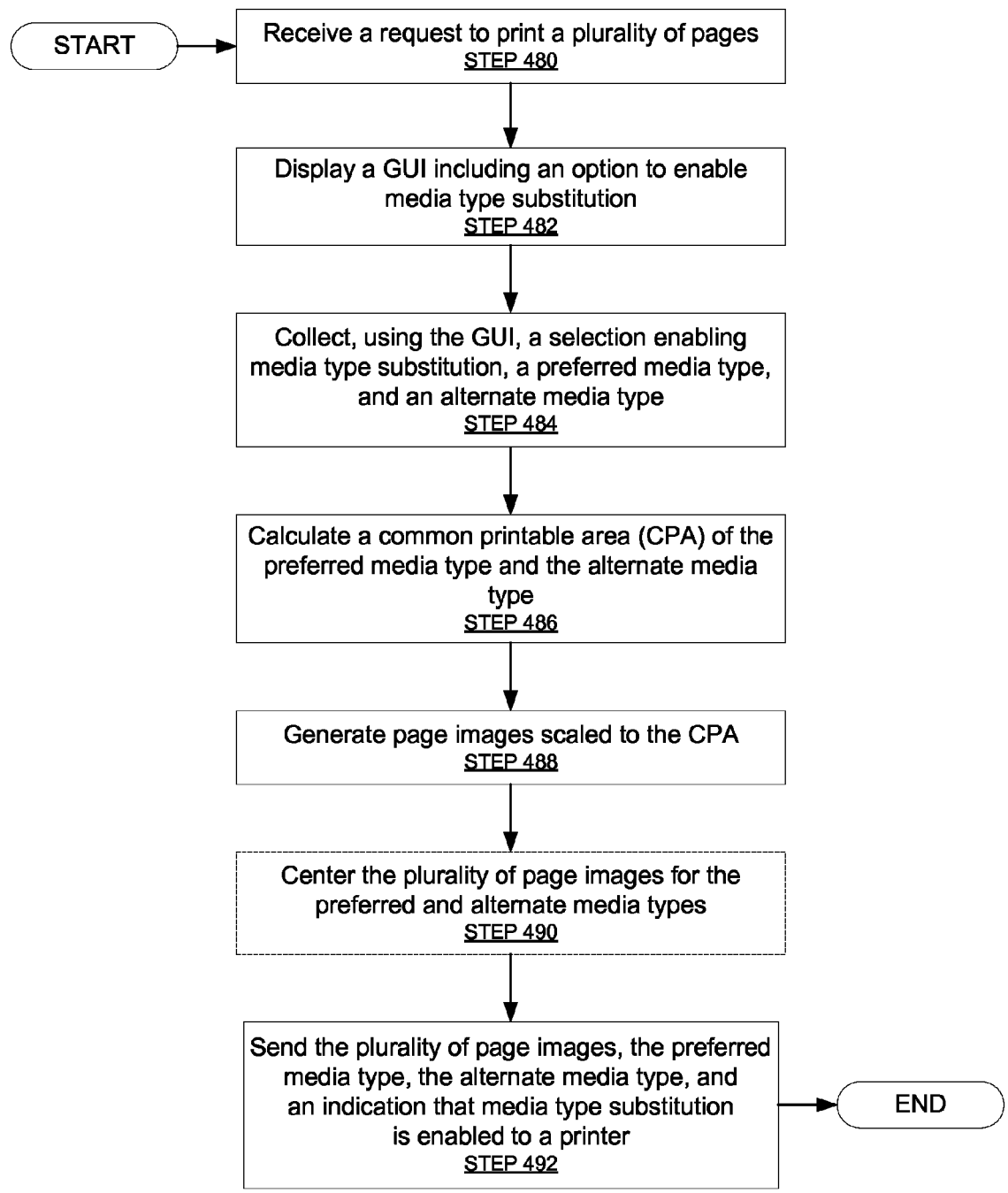

FIG. 4B shows a flow chart in accordance with one or more embodiments of the invention. The process shown in FIG. 4B may be used for raster printing one or more pages of a document. Further, one or more steps in FIG. 4B may be executed by a printer driver (e.g., printer driver (104), discussed above in referenced to FIG. 1). In one or more embodiments of the invention, one or more of the steps shown in FIG. 4B may be omitted, repeated, and/or performed in a different order than that shown in FIG. 4B. Accordingly, the specific arrangement of steps shown in FIG. 4B should not be construed as limiting the scope of the invention.

Initially, a request to print multiple pages is received by the printer driver software (STEP 480). The pages may be part of an electronic document that a user is printing. Next, the printer driver software displays a graphical user interface (GUI) including an option to enable media type substitution to a user (STEP 482). The GUI may be displayed on any computing device from which a user sends a command to print a document. At this stage, the printer driver software collects, using the GUI, a selection enabling media type substitution, a preferred media type, and an alternate media type (STEP 484). More specifically, the user selects, via the GUI, the option for enabling media type substitution, selects a preferred media type (or uses the default preferred media type), and selects an alternate media type. Each of these inputs is collected by the printer driver software. STEPS 480, 482, and 484 may be essentially the same as STEPS 400, 402, and 404, discussed above in reference to FIG. 4A.

In STEP 486, upon collecting the information from the GUI inputs made by the user, the printer driver software calculates a common printable area (CPA) of the preferred media type and the alternate media type. In one or more embodiments of the invention, the CPA is defined as the overlapping portion of the printable areas of the preferred and alternate media type (i.e., the printable area that is common to both preferred and alternate media types). In one or more embodiments of the invention, the computing device upon which the printer driver software executes may store, in memory, the dimensions for the printable areas of each media type supported by the printer to which the printer driver software is operatively connected. Thus, the printer driver software may obtain these dimensions stored in memory for the preferred and alternate media types, and use these dimensions to calculate the maximum CPA for the preferred media type and the alternate media type. Alternatively, CPAs for various pairs or groupings of preferred and alternate media types may be pre-calculated and stored in memory of the computing device. In this case, the printer driver software may merely obtain the stored pre-calculated CPA for the selected preferred and alternate media types.

In STEP 488, the printer driver software generates page images (i.e., rasterized image data) scaled to the calculated CPA (STEP 488). More specifically, each page image is modified (e.g., scaled, clipped, etc.) to fit to match the dimensions of the CPA. In some cases, a modification (reduction or enlargement) of the contents is carried out to generate the page images of the matched dimensions. In an optional step, when the image centering option is selected by a user (STEP 490), the printer driver software may generate printer instructions to center the plurality of page images within the printable area of the media type. Alternatively, the page images may be corner aligned (e.g., top left corner aligned) during printing with the printable area of the media type. In one or more embodiments of the invention, corner alignment may be a default setting.

Upon adjusting or scaling the page images to be printed, the printer driver software sends a print job including the plurality of page images, the preferred media type, the alternate media type, and an indication that media type substitution is enabled to a printer configured to print the page images (STEP 492). More specifically, the instruction data sent from the printer driver to the printer includes a command for media type substitution, an indication of the preferred media type and an indication of the alternate media type.

Figure 5A:
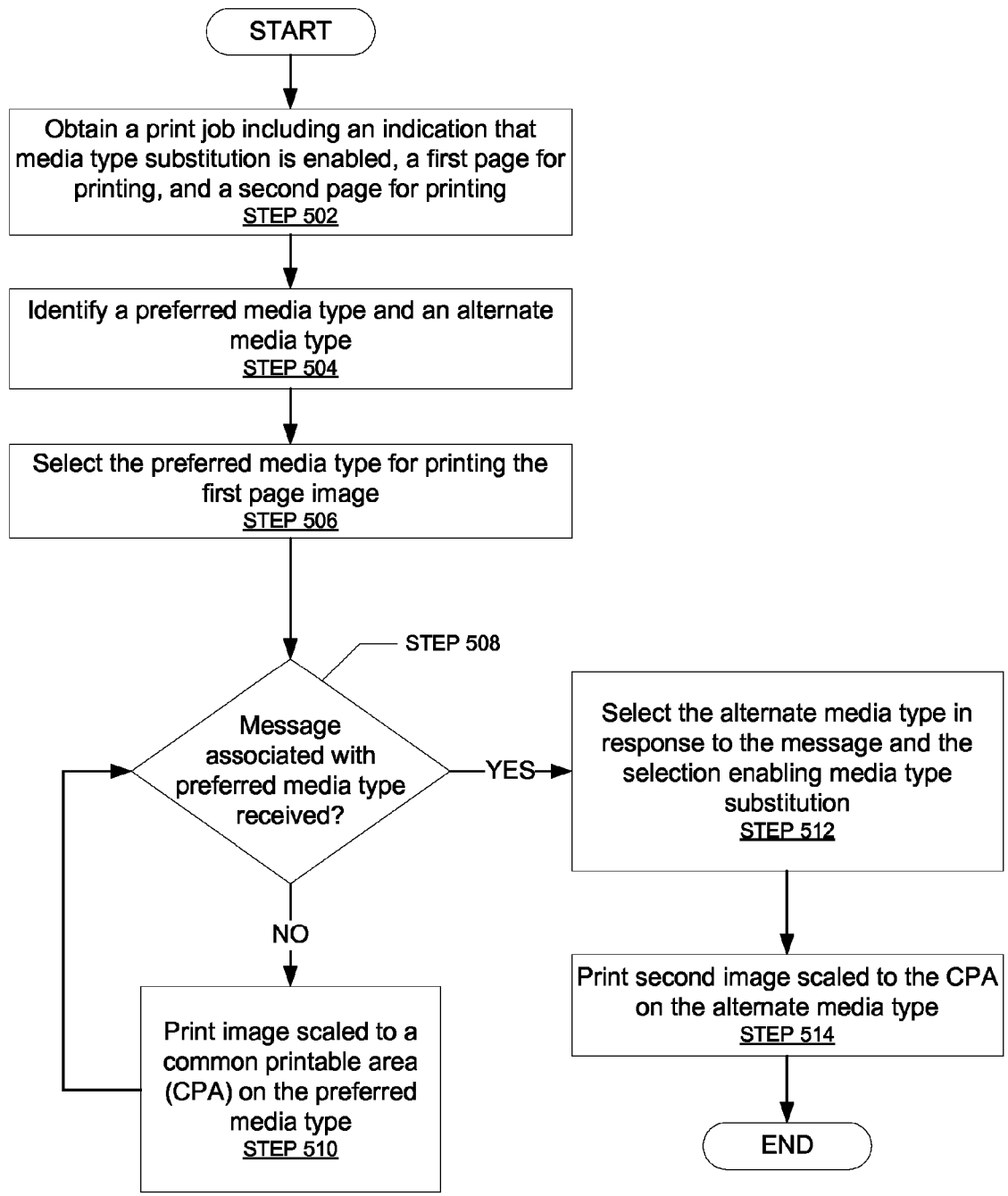

FIG. 5A shows a flow chart in accordance with one or more embodiments of the invention. The process described in FIG. 5A may be executed to print incoming rasterized pages. Further, one or more steps in FIG. 5A may be executed by a printer (e.g., printer (112), discussed above in reference to FIG. 1). In one or more embodiments of the invention, one or more of the steps shown in FIG. 5A may be omitted, repeated, and/or performed in a different order than that shown in FIG. 5A. Accordingly, the specific arrangement of steps shown in FIG. 5A should not be construed as limiting the scope of the invention.

Initially, a print job is obtained (STEP 502). The print job includes an indication that media type substitution is enabled, a first page image for printing, and a second page image for printing. Those skilled in the art will appreciate that the first and second page images may be consecutive page images from a document being printed. Alternatively, there may be several page images between the first and second page images of FIG. 5A. Thus, the first and second page images do not represent any particular order; they are merely used in the following discussion as two distinct page images being printed. Next, the printer identifies a preferred media type and an alternate media type based on the selections made by a user via a GUI (STEP 504). The preferred media type is selected by the printer for printing the first page image (STEP 506). More specifically, the printer identifies the printer tray storing the preferred media type and selects that printer tray as the tray from which paper should be used for printing the page images received.

At this stage, a determination is made as to whether a message associated with the preferred media type is received by the printer (STEP 508). In one or more embodiments of the invention, a message may be a warning message and/or an error message regarding the printer tray storing the preferred media type. For example, in one or more embodiments, a message is received by the printer when the printer tray storing the preferred media type is empty, or when the printer tray storing the preferred media type has a paper jam, or for any other suitable error that may occur at the printer tray storing the preferred media type. In one or more embodiments of the invention, the indication that media type substitution is enabled is sent to the printer before any message regarding the printer tray storing the preferred media type is received by the printer. If no message is received, then the current page image (in this case the first page image) is printed on the preferred media type (STEP 510). After each current page image is printed on the preferred media type, a check is made as to whether a message regarding the printer tray storing the preferred media type is received by the printer (STEP 508).

When a message regarding the printer tray storing the preferred media type is received, the printer automatically selects the printer tray storing the alternate media type (STEP 512). More specifically, in response to the received message and the received indication of enabled media type substitution, the printer looks for, finds, and selects the printer tray storing the alternate media type for continued printing of the page images. In one or more embodiments of the invention, the printer selects the printer tray storing the alternate media type without any temporary suspension or temporary termination of a print job, and without any further action needed by the user or the printer driver software. More specifically, because the indication of the enabled media type substitution is sent to the printer before any message regarding the preferred media type is received, the printer knows ahead of time (i.e., before any problems/errors occur with the preferred media type) to substitute an alternate media type for the printing of the current document or the current print job. In this manner, the printer is able to seamlessly switch to the printer tray storing the alternate media type for continuous printing of the page images received without any further input necessary on the part of the user.

In one or more embodiments of the invention, a message regarding the printer tray storing the preferred media type is received before any page image of the print job is printed. In other words, although a user has specified a preferred media type, the preferred media type may be unavailable even before the print job begins printing. In such embodiments, the printer may print the entire print job on the alternative media type. For example, although a user sets the preferred media type of the print job to A4 and the alternate media type of the print job to Letter, the printer may choose the alternative media type (Letter) at the very beginning of the print job (from the first page image) because there is a problem with the printer tray storing the preferred media type even before the first page image is printed.

Continuing with FIG. 5A, if no printer tray storing the alternate media type is found in STEP 512, then the printer issues an error message and temporarily suspends printing (not shown). For instance, the error message may instruct a user to load the preferred media type or the alternate media type in a printer tray. Alternatively, the message may instruct the user to load the preferred media type, instead of the alternate media type, or vice versa. In an alternate embodiment, if there are multiple printer trays storing the alternate media types, then the printer may prioritize among the multiple print trays and use each one as an auxiliary supply of paper until all the page images for the current print job or the current document are printed.

Finally, in STEP 514, the second page image is printed on the alternate media type. Those skilled in the art will appreciate that the message may be received by the printer at any time after selection of the printer tray storing the preferred media type. For example, the message may be received before the first page image is printed, immediately after the first page image is printed, or between the time that the first page image is printed and the second page image is printed, when the first and second page images are not consecutive. When the message is received before the first page image is printed, all the page images including those between the first and second images are printed on the alternate media type. When the message is received after the first page image is printed, but before the second page image is printed, a portion of the page images in between the first and second page images and the second page image itself are printed on the alternate media type. If there is no message received by the printer regarding the printer tray storing the preferred media type, then all page images for a current print job or the current document being printed are printed on the preferred media type.

Figure 5B:
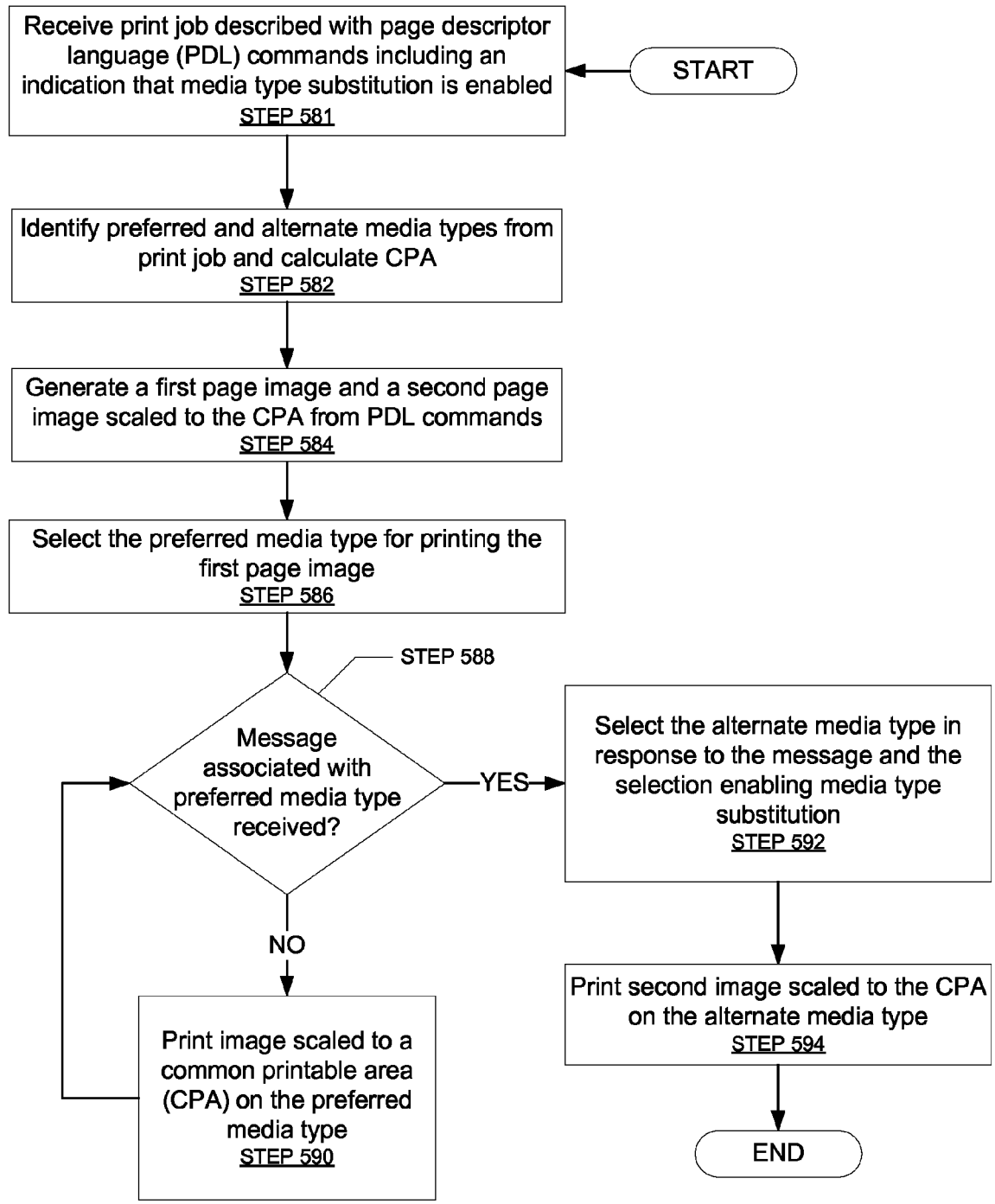

FIG. 5B shows a flow chart in accordance with one or more embodiments of the invention. The process described in FIG. 5B may be executed to print a print job described with PDL commands. Further, one or more steps in FIG. 5B may be executed by a printer (e.g., printer (112), discussed above in reference to FIG. 1). In one or more embodiments of the invention, one or more of the steps shown in FIG. 5B may be omitted, repeated, and/or performed in a different order than that shown in FIG. 5B. Accordingly, the specific arrangement of steps shown in FIG. 5B should not be construed as limiting the scope of the invention.

Initially, a print job comprising multiple PDL commands is received by the printer (STEP 581). The print job includes an indication that media type substitution is enabled. The print job may also include instructions to center all page images within the printable area of a media type (not shown). As discussed above, the PDL commands/instructions include various print objects (e.g., text objects, graphic objects, image objects) and control objects (e.g., blend and transparency commands, color management information) to describe the content and the layout of the pages for printing. In one or more embodiments of the invention, the indications of the media type substitution being enabled and the centering being enabled may be included in the print job in the form of PJL (Print Job Language), which is usually located ahead of the PDL data in a print job.

In STEP 582, the preferred media type and the alternate media type are identified from the print job, and a CPA of the preferred media type and the alternate media type is calculated.

In STEP 584, a first and a second page image are generated by interpreting the PDL commands. Specifically, the printer may rasterize the objects in the PDL commands to generate page images modified (i.e., scaled, clipped, etc.) to match the dimensions of the CPA. After STEP 584, the process proceeds to STEP 586. STEPS 586, 588, 590, 592, and 594 are essentially the same as STEPS 506, 508, 510, 512, and 514, discussed above in reference to FIG. 5A.

Those skilled in the art will appreciate that although FIG. 5A and FIG. 5B only discuss the printing of a first and a second page image, the same process described above is followed for any number of page images that are to be printed by the printer. Further, those skilled in the art will appreciate that if there are multiple alternate media types selected by a user, a second alternate media type is selected when a message is received regarding a first alternate media type. More specifically, there may be priorities allocated to each of the multiple alternate media types, such that the alternate media type with the highest priority is selected by the printer first, and when a message is received regarding the printer tray storing highest priority alternate media type, the next highest priority alternate media type is substituted for the first alternate media type.

Figure 6A:
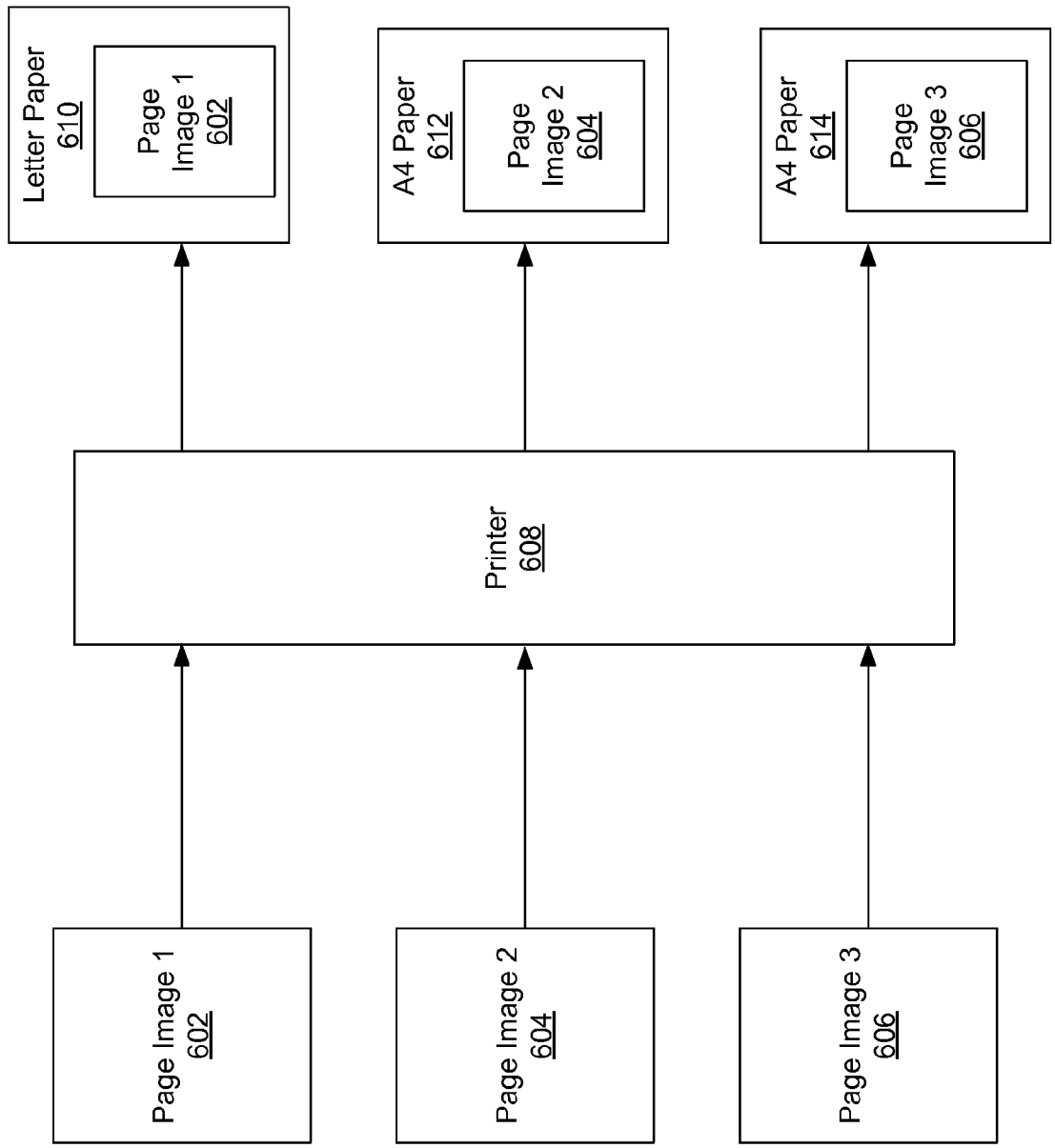

FIG. 6A shows an example of printing a document in accordance with one or more embodiments of the invention. Specifically, in the example of FIG. 6A, the document being printed includes three page images (e.g., page image 1 (602), page image 2 (604), page image 3 (606)). Each page image (602, 604, 606) is sent as input to a printer (608), along with the indication that media type substitution is enabled by a user. In the example of FIG. 6A, media type substitution is restricted to A4 and letter media types (i.e., A4 media type may be a substitute for letter media type and vice versa). In addition, letter paper is the preferred media type and A4 is the alternate media type.

When the printer (608) begins printing the page image 1 (602), no message regarding the printer tray storing letter paper has been received. Accordingly, page image 1 (602) is output on letter paper (610). At this stage, a message is received by the printer (608) indicating that the printer tray storing letter paper is out of paper. In response to this message, and in response to the already received indication that media type substitution is enabled, the printer (608) automatically selects the printer tray storing A4 paper for continued printing. Accordingly, page image 2 (604) and page image 3 (606) are output by the printer on A4 paper (612 and 614, respectively). Thus, when the user retrieves the hard copy of the document including page images 1, 2, and 3 (602, 604, 606), the user obtains a printed copy of the document with page image 1 (602) on letter paper and page images 2 and 3 (604, 606) on A4 paper. Each page image is printed within the CPA calculated for A4-letter media type substitution and is modified to match a dimension of the calculated CPA. Further, each page image is corner aligned by the top left corner because corner alignment is the default setting and the user did not select image centering.

Those skilled in the art, having the benefit of this detailed description, will appreciate that corner alignment in the case of letter and A4 media types provides an advantage. Specifically, after printing a print job on a combination of letter and A4 paper, the longer portion of the A4 paper (with respect to the letter paper) and the wider portion of the letter paper (with respect to the A4 paper) may simply be cut or torn off, as these portions will not include any portion of the printed page images. Thus, using the document of FIG. 6A including page images 1-3 as an example, the longer portions of the A4 paper used to print page images 2 and 3 can be cut off, effectively making the A4 paper the same length as the letter paper.

FIG. 6B shows an example of printing a document in accordance with one or more embodiments of the invention. Specifically, in the example of FIG. 6B, a PDL print job (699) is sent as input to a printer (688). The PDL print job (699) includes instructions for printing three pages. The PDL print job (699) also includes an instruction/indication that media type substitution is enabled by a user. In the example of FIG. 6B, media type substitution is restricted to A4 and letter media types (i.e., A4 media type may be a substitute for letter media type and vice versa). In addition, letter paper is the preferred media type and A4 is the alternate media type. The printer (688) generates three page images (i.e., Page Image 1 (682), Page Image 2 (684), Page Image 3 (686)) based on the PDL print job (699). Specifically, the printer (688) rasterizes the objects in the PDL print job (699) to generate the three page images (682, 684, 686).

When the printer (688) begins printing the page image 1 (682), no message regarding the printer tray storing letter paper has been received. Accordingly, page image 1 (682) is output on letter paper (690). At this stage, a message is received by the printer (688) indicating that the printer tray storing letter paper is out of paper. In response to this message, and in response to the already received indication that media type substitution is enabled, the printer (688) automatically selects the printer tray storing A4 paper for continued printing. Accordingly, page image 2 (684) and page image 3 (686) are output by the printer on A4 paper (692 and 694, respectively). Thus, when the user retrieves the hard copy of the document including page images 1, 2, and 3 (682, 684, 686), the user obtains a printed copy of the document with page image 1 (682) on letter paper and page images 2 and 3 (684, 686) on A4 paper. Each page image is printed within the CPA calculated for A4-letter media type substitution and is modified to match a dimension of the calculated CPA. Further, each page image is corner aligned by the top left corner because corner alignment is the default setting and the user did not select image centering.

Those skilled in the art, having the benefit of this detailed description, will appreciate that corner alignment in the case of letter and A4 media types provides an advantage. Specifically, after printing a print job on a combination of letter and A4 paper, the longer portion of the A4 paper (with respect to the letter paper) and the wider portion of the letter paper (with respect to the A4 paper) may simply be cut or torn off, as these portions will not include any portion of the printed page images. Thus, using the document of FIG. 6B including page images 1-3 as an example, the longer portions of the A4 paper used to print page images 2 and 3 can be cut off, effectively making the A4 paper the same length as the letter paper.

Figure 7:
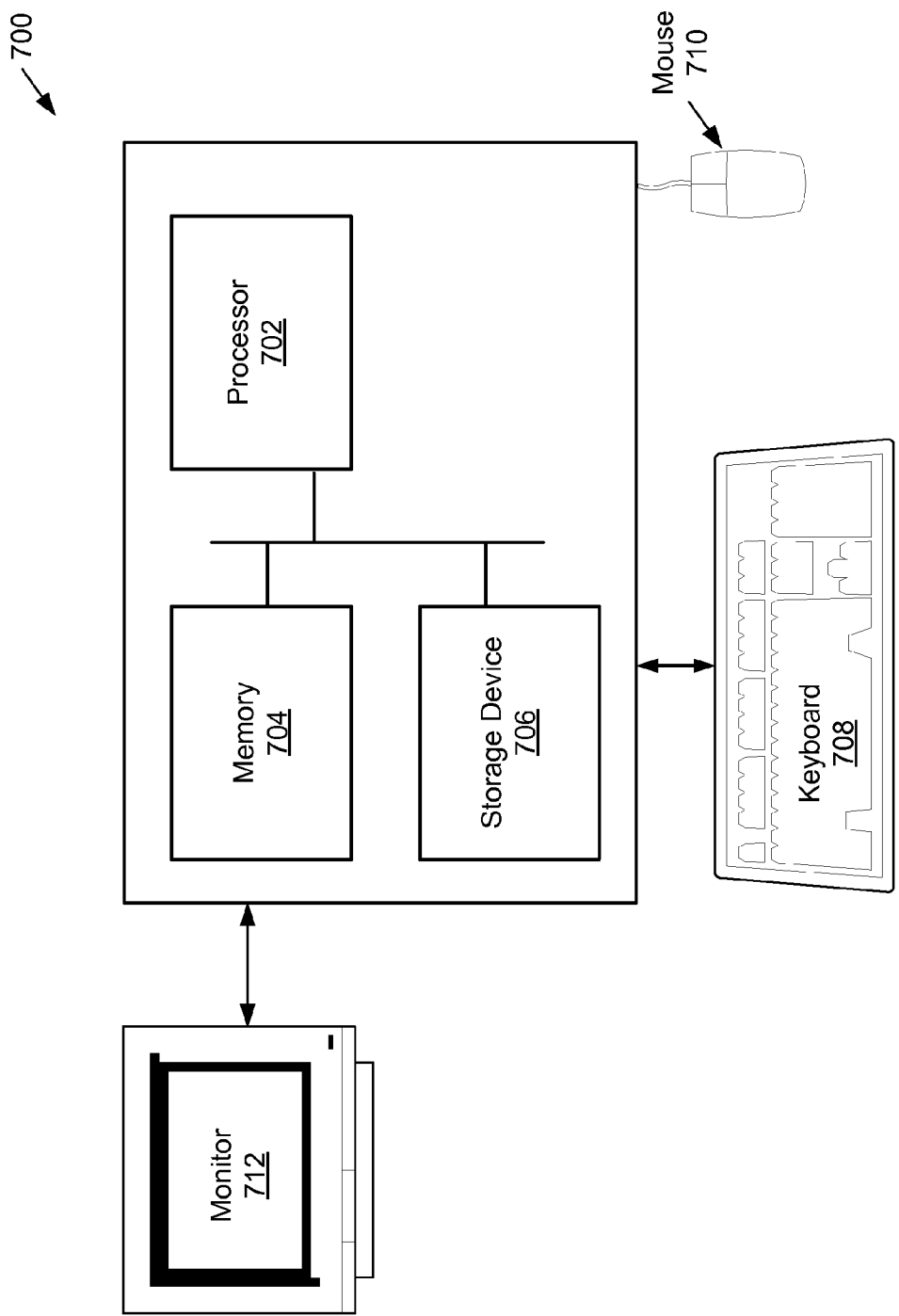
FIG. 7 shows a computing device in accordance with one or more embodiments of the invention.

The invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN), a wide area network (WAN), the Internet, etc. (not shown) via a network interface connection (not shown). Those skilled in the art will appreciate that these input and output means may take other forms, now known or later developed. Further, those skilled in the art will appreciate that one or more elements of the aforementioned computer (700) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a tangible computer readable medium such as a compact disc (CD), a diskette, a tape, or any other tangible computer readable storage device. Further, one or more embodiments of the invention may be implemented as an Application Program Interface (API) executing on a computer system(s), where the API includes one or more software instructions.

Embodiments of the invention provide a method and system for printing a document on one or more different alternate media types when a problem occurs at the printer with a preferred media type. That is, embodiments of the invention provide a method and system for common printing on a pair or group of media types. Further, embodiments of the invention permit a user to select media type substitution prior to sending a print job to the printer, at the time other printing options/settings are selected by a user, which allows for instructions for media type substitution to be sent to the printer before a warning/error message is received by the printer. This allows for the printer to perform media type substitution without any temporary suspension/termination of the current print job and without any further input necessary from a user. This enables continuous printing of a document without interruptions and/or any active input from a user. Embodiments of the invention are particularly useful when the contents of the printed document are not highly important to the user, which results in media type substitution being ideal for the user because the user is not particular about how the document's appearance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for printing, comprising:
   obtaining, by a printer, a print job including a selection for enabling media type substitution and specifying a preferred media type and an alternate media type, wherein the print job comprises a plurality of page descriptor language (PDL) commands comprising a plurality of objects;
   generating, by the printer, a first page image and a second page image from the print job by rasterizing the plurality of objects;
   calculating, by the printer, a common printable area (CPA) for the preferred media type and the alternate media type in response to interpreting at least one of the plurality of PDL commands,
   wherein the first page image and the second page image are modified to match a dimension of the CPA before printing;
   selecting, by the printer, the preferred media type for printing the first page image;
   receiving, by the printer, a message associated with the preferred media type after selecting the first media type, wherein the printer receives the selection enabling media type substitution prior to receiving the message;
   selecting, by the printer, the alternate media type in response to the message and the selection enabling media type substitution; and
   printing the second page image using the alternate media type,
   wherein the preferred media type and the alternate media type have different sizes.

2. The method of claim 1, further comprising:
   printing the first page image using the preferred media type before receiving the message, wherein the message indicates an unavailability of the preferred media type.

3. The method of claim 1, further comprising:
   printing the first page image using the alternate media type after receiving the message, wherein the message indicates an unavailability of the preferred media type.

4. The method of claim 1, wherein the preferred media type and the alternate media type differ in weight.

5. The method of claim 1, further comprising:
   printing the first page image centered within a printable area of the preferred media type, wherein the second page image is printed centered within a printable area of the alternate media type.

6. The method of claim 1, further comprising:
   printing the first page image corner aligned with a printable area of the preferred media type, wherein the second page image is printed corner aligned with a printable area of the alternate media type.

7. The method of claim 1, wherein the preferred media type is A4 paper and wherein the alternate media type is Letter paper.

8. The method of claim 1, wherein the message indicates a paper jam in a printer tray storing the preferred media type.

9. The method of claim 1, wherein the approval for media type substitution is provided by a user, and wherein the indication of the approval is provided by a printer driver.

10. A method for printing, comprising:
    receiving a request to print a plurality of pages;
    displaying, within a graphical user interface (GUI), a plurality of printing options including an option to enable media type substitution;
    collecting, using the GUI, a selection enabling media type substitution, a preferred media type, and an alternate media type;
    generating a plurality of page descriptor language (PDL) commands based on the selection enabling media type substitution, the preferred media type, and the alternate media type, and comprising a plurality of objects based on the plurality of pages; and
    sending a print job including the plurality of PDL commands to a printer,
    wherein the print job specifies the preferred media type and the alternate media type,
    wherein the preferred media type and the alternate media type have different sizes,
    wherein the printer calculates a common printable area (CPA) shared by the preferred media type and the alternate media type in response to interpreting at least one of the plurality of PDL commands,
    wherein the printer generates a plurality of page images including a first page image and a second page image by rasterizing the plurality of objects, wherein the printer modifies the first page image and the second page image to match a dimension of the CPA before printing, wherein the printer comprises functionality to select, after selecting the preferred media type for printing the first page image, the alternate media type based on a received message and the selection enabling media type substitution, and wherein the printer prints the second page image using the alternate media type.

* * * * *